US006053232A

United States Patent [19]
Biagiotti

[11] Patent Number: 6,053,232
[45] **Date of Patent: *Apr. 25, 2000**

[54] EMBOSSING AND LAMINATING MACHINE WITH EMBOSSING CYLINDERS HAVING DIFFERENT ROTATIONAL SPEED

[75] Inventor: Guglielmo Biagiotti, Capannori, Italy

[73] Assignee: Fabio Perini, S.p.A., Lucca, Italy

[ * ] Notice: This patent is subject to a terminal disclaimer.

[21] Appl. No.: 09/077,230

[22] PCT Filed: Dec. 2, 1996

[86] PCT No.: PCT/IT96/00238

§ 371 Date: Oct. 28, 1998

§ 102(e) Date: Oct. 28, 1998

[87] PCT Pub. No.: WO97/20687

PCT Pub. Date: Jun. 12, 1997

[30] Foreign Application Priority Data

Dec. 5, 1995 [IT] Italy .................................. FI95A0249

[51] Int. Cl.[7] ............................. B32B 31/08; B32B 31/20

[52] U.S. Cl. .......................... 156/459; 156/580; 156/209; 156/290

[58] Field of Search .................................... 156/209, 219, 156/290, 292, 324, 347, 580, 537, 459, 553

[56] References Cited

U.S. PATENT DOCUMENTS 3,414,459 12/1968 Wells .
3,961,119 6/1976 Thomas .
4,742,968 5/1988 Young, Jr. et al. ........................ 242/65
5,096,527 3/1992 Biagiotti ................................ 156/209
5,667,619 9/1997 Alikhan .................................. 156/253

FOREIGN PATENT DOCUMENTS 0 370 972 A1 5/1990 European Pat. Off. .
0 426 548 B1 11/1994 European Pat. Off. .

OTHER PUBLICATIONS

PCT/IT 96/00238 International Search Report.

*Primary Examiner*—Sam Chuan Yao
*Attorney, Agent, or Firm*—Leydig, Voit & Mayer, Ltd.

[57] ABSTRACT

An embossing and laminating machine comprising a first embossing cylinder with a surface provided with a first set of protuberances, a second embossing cylinder with a surface provided with a second set of protuberances, said two embossing cylinders forming a nip, and a first and a second pressure roller interacting with said first and second embossing cylinders respectively; and in which said sets of protuberances are made in such a way that in said nip some of said first set of protuberances coincide with some of said second set of protuberances, while other protuberances of said first set are out of phase with corresponding protuberances of said second set, wherein said embossing cylinders are mechanically connected by a transmission which does not keep the cylinders in phase and which causes slight relative slippage between said embossing cylinders.

12 Claims, 8 Drawing Sheets

EMBOSSING AND LAMINATING MACHINE WITH EMBOSSING CYLINDERS HAVING DIFFERENT ROTATIONAL SPEED

DESCRIPTION

1. Technical Field

The invention relates to an embossing and laminating machine comprising a first embossing cylinder with a surface provided with a first set of protuberances, a second embossing cylinder with a surface provided with a second set of protuberances, the said two embossing cylinders forming a nip, and a first and a second pressure roller interacting with the first and the second embossing cylinder respectively; and in which the protuberances of the said first and the said second sets are made in such a way that in the said nip some of the protuberances of the first set coincide with some protuberances of the second set, while other protuberances of the first set are out of phase with corresponding protuberances of the second set.

2. Prior Art

Embossing machines are commonly used for the processing of paper layers in order to form a semi-finished product intended for the production of rolls of toilet paper, rolls of kitchen towels, tissues, paper serviettes, and the like.

An embossing and laminating device and a method of the conventional type are described, for example, in U.S. Pat. No. 3,414,459. The device described therein has completely identical and symmetrical embossing cylinders, with protuberances aligned in lines parallel to the axes of the corresponding cylinders. To overcome certain disadvantages of this device, EP-B-0,370,972 describes an embossing machine in which the cylinders are completely symmetrical with respect to each other and the protuberances are aligned in lines, all of which are inclined with respect to the axes of the corresponding cylinders.

The embossing cylinders of these known devices (called tip-to-tip machines) are symmetrical and must be perfectly in phase, in such a way that in the area of their closest approach, where they are virtually in contact with each other at the positions of their protuberances and where the two layers are joined by pressure and gluing, there is an exact correspondence between all the protuberances of one cylinder and the corresponding protuberances of the other cylinder. Essentially, the protuberances of one cylinder are disposed in a right-hand spiral and the protuberances of the other are disposed in a left-hand spiral, the spirals having equal and opposite inclinations with respect to the axes of the corresponding cylinders. In this way a strip product is obtained, in which the protuberances of one layer coincide with those of the other layer and adhere to them, when one set of protuberances has been pressed against the other, after an adhesive has been applied to the protuberances of one of the layers.

To overcome certain problems which arise when cylinders provided with very small and very closely-packed protuberances are used, it has been proposed (EPA-0,426,548) that two layers should be embossed with different patterns, in other words patterns in which in at least one direction of alignment the protuberances of one layer have a different interval from that of the protuberances disposed in the same direction on the other layer. In this way a strip is obtained in which the layers are joined to each other in restricted areas and not over the whole area of the strip.

In practice, only some of the protuberances of one embossing cylinder correspond to the protuberances of the other cylinder in the nip between the two embossing cylinders through which the two layers to be joined and laminated are made to pass. Thus there are small areas on both embossing cylinders in which the protuberances are subjected to mechanical and compressive stresses (where the layers are joined) and large areas where the protuberances are not subject to stresses (where there is no reciprocal correspondence between the protuberances of the two cylinders).

In embossing machines of the tip-to-tip type, the two embossing cylinders are kept exactly in phase and are adjusted so as to keep the protuberances of one cylinder always exactly in phase with the protuberances of the other cylinder. For this purpose, the two cylinders are connected mechanically by means of a pair of gears with devices for the resetting of the play in their engagement. The adjustment of the embossing machine is an extremely lengthy and complex operation, particularly as a result of the very small dimensions of the protuberances, the machining tolerances, the static deformations due to the inherent weight and to the embossing stresses, and the thermal deformations due to the heat generated by the compression of the coating of the pressure rollers in normal operating conditions.

The pressure exerted on the two layers during lamination between the embossing cylinders is considerable. When, as in EP-A-0,426,548, the areas of contact are reduced, there is a concentration of the stresses and an increase in the specific pressure, which eventually results in the protuberances being crushed in the areas of contact.

Indeed, it has been found that the embossing cylinders made to produce a strip material as described in EP-A-0,426,548 are subject to crushing in circumscribed areas (areas of contact) much more rapidly than conventional embossing cylinders designed to operate with exact coincidence between all the protuberances of one cylinder and all the corresponding protuberances of the other cylinder in the lamination area, and a consequent distribution of the stresses over a large surface area.

DISCLOSURE OF THE INVENTION

The object of the--present invention is to produce an embossing and laminating machine which requires no phase matching between the embossing cylinders and which at the same time eliminates the disadvantage of having the pressure concentrating on, and consequently crushing, the protuberances on the cylinders.

For this purpose, a transmission system between the embossing cylinders is provided which permits slippage between the cylinders and does not keep the cylinders in phase. This solution to the aforementioned problems is based on the recognition of the fact that if the protuberances of the cylinders correspond to each other in certain areas only, and not over the whole line of contact in the lamination nip between the two embossing cylinders, it is no longer necessary to keep the cylinders in phase with each other. The slippage may be of the order of 0.5–3 ‰.

This ensures a much longer service life of the embossing cylinders, not only because the crushing due to the pressure is less rapid since it is distributed over all the protuberances, but also because a greater degree of crushing can be tolerated. In systems in which the protuberances are deformed in certain areas, the crushing of the working protuberances soon becomes such that correct lamination of the layers is no longer possible without the reciprocal interference of the non-deformed protuberances, but this is not the case with the embossing machine according to the invention, in which the crushing is uniform over the whole cylinder and can therefore be easily compensated by reducing the gap between the embossing cylinders. The concentrated crushing in certain areas, which is typical of known systems, also causes serious problems as far as applying glue to the layers is concerned. This is because, when the areas of contact between the cylinders become lower than the adjacent areas, the layer supported on the cylinder does not receive any glue in these areas, and therefore the two layers are not joined together. A limited degree of crushing concentrated in the area of contact between the embossing cylinders is sufficient for adhesion to be lost between the layers leaving the embossing and laminating machine.

The absence of phase matching and the use of a transmission which causes slippage between the two cylinders makes it possible to dispense with the whole laborious operation of adjusting the machine, with considerable savings of time and money. It also avoids all the problems due to the localized crushing of the protuberances.

The use of a belt transmission, for example, has the further advantage of reducing the construction and maintenance costs of the transmission system. The lubrication problems typical of gear systems used hitherto for transmission of the motion are also avoided, and transmission noise is also reduced.

Even greater advantages are obtained by using two embossing cylinders with slightly different diameters and keeping their peripheral velocities theoretically equal (except for the slippage due to the type of transmission), by using flat pulleys with appropriate diameters. In this way the two cylinders, rotating one against the other, continuously change the points of reciprocal contact even if the slippage of the belt is zero.

Further advantageous characteristics of the embossing machine according to the invention are indicated in the following description and in the attached claims.

BRIEF DESCRIPTION OF THE DRAWINGS

The invention will be more clearly understood from the description and the attached drawing, which shows a practical and non-restrictive example of the invention. In the drawing.

DETAILED DESCRIPTION OF THE EMBODIMENTS OF THE INVENTION

Figure 1:
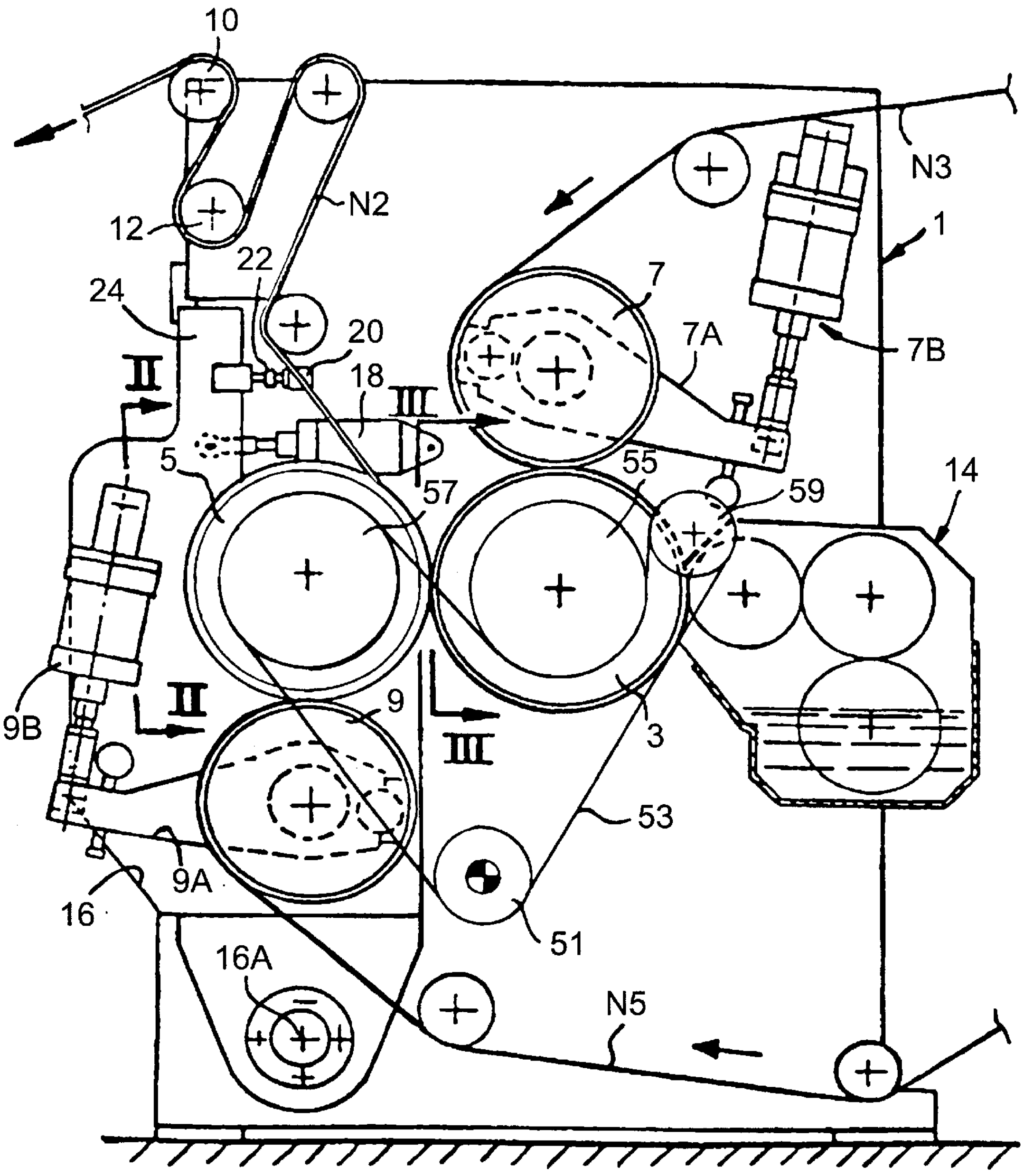
FIG. 1 is a diagram of the embossing and laminating machine.

With reference to FIG. 1, an embossing and laminating machine, indicated by the number 1, will be described initially in a summary way.

Two embossing cylinders 3 and 5, disposed with parallel axes, and having their surfaces provided with protuberances for embossing, are mounted on the frame of the machine 1. In the nip formed by the two cylinders 3 and 5, the protuberances (or rather some of them, as will be explained subsequently) are in contact with each other.

The embossing cylinder 3 interacts with a pressure roller 7 which may also be provided with an embossed surface, or may be covered with a yielding material such as rubber or the like. The number 9 indicates a second pressure roller similar to the roller 7 and interacting with the embossing cylinder 5. The two pressure rollers 7 and 9 are mounted on corresponding moving elements 7A and 9A which are hinged and subject to an elastic force, for example through two cylinder and piston systems 7B, 9B which press the corresponding pressure rollers against the corresponding embossing cylinders 3 and 5.

N3 and N5 indicate two layers of paper material or the like which are fed between the embossing cylinder 3 and the pressure roller 7 and between the embossing cylinder 5 and the pressure roller 9 respectively, so that they are embossed separately. The two embossed layers remain engaged with the corresponding embossing cylinders 3 and 5 and, after an adhesive has been applied by the unit 14 to the protuberances of the layer N3, are joined together in the nip between the two embossing cylinders 3 and 5, where the protuberances of one embossing cylinder move at a distance which is less than the combined thickness of the two layers N3 and N5 from the protuberances of the other embossing cylinder. In this way the necessary pressure for gluing the two layers and for forming a double strip material N2 is obtained, after which the material is removed by return rollers 10 and 12, or by another known method, to be subjected to further processing on a production line, for example winding into rolls.

The two embossing cylinders 3 and 5 are made with protuberances P3 and P5 distributed in such a way that, in the area where the layers are joined, only some of the protuberances P3 coincide with corresponding protuberances P5, while in the other areas there is no coincidence.

This may be done in a known way, by distributing the protuberances as described in EP-A-0,426,548, in other words by forming the protuberances on one cylinder with an interval different from the interval of the protuberances on the other cylinder. However, this has the disadvantage that the two embossing cylinders have to be machined with different tools.

Alternatively, the two embossing cylinders 3, 5 may be made in such a way that they have the same pattern embossed on both cylinders, but disposed at inclinations such that there is no superimposition, in other words correspondence, between all the protuberances of one cylinder and all the protuberances of the other cylinder, but there is superimposition or coincidence in certain areas.

Figure 2:
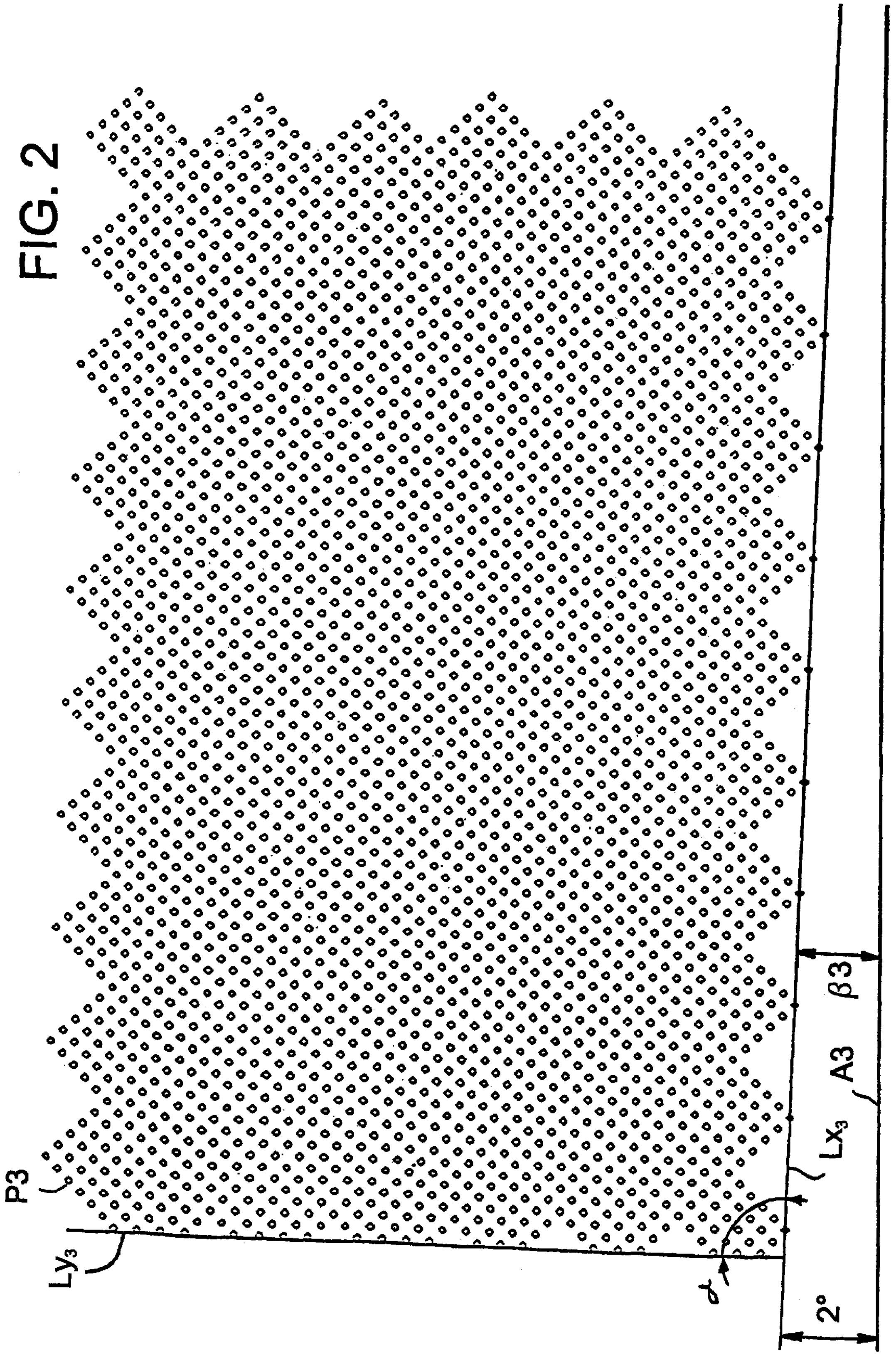
FIGS. 2 and 3 are two views, through II—II and III—III in FIG. 1 respectively, of a portion of the plane development of the cylindrical surfaces of the two embossing cylinders, in a possible embodiment.
Figure 3:
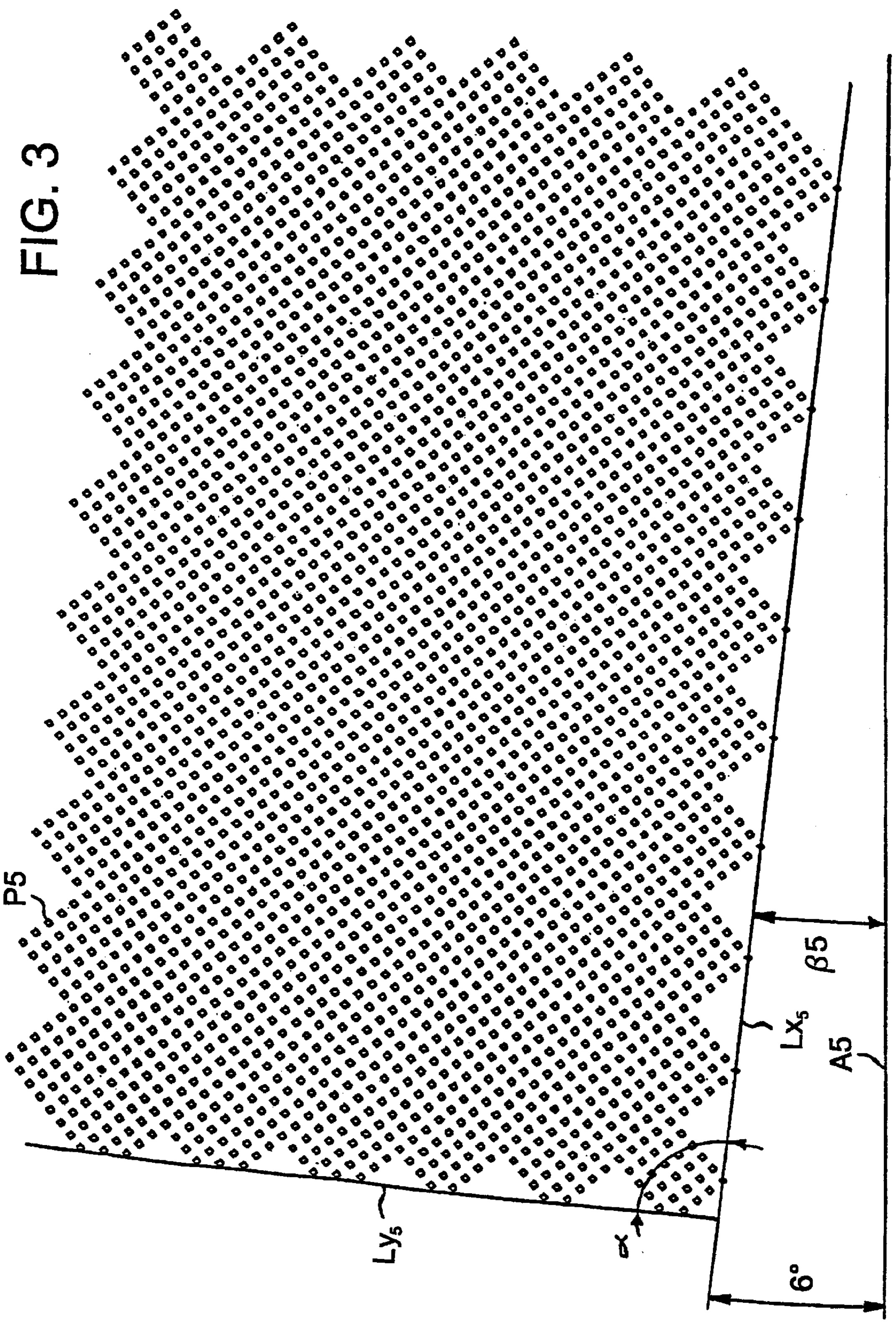

For this purpose, according to a first embodiment, when the two embossing cylinders 3 and 5 are viewed from the same side (lines II—II and III—III in FIG. 1) they show two sets of protuberances (a first set on the embossing cylinder 3 and a second set on the embossing cylinder 5), represented in partial plane development in FIGS. 2 and 3.

The protuberances P3 of the first set (embossing cylinder 3) are aligned in a first and second direction of alignment indicated by $Lx_3$ and $Ly_3$, forming between them an angle $\alpha$ other than zero. In the example illustrated in FIG. 2, the protuberances P3 are disposed with the same interval along $Lx_3$ and along $Ly_3$, but this need not be so. The direction $LX_3$ forms an angle $\beta_3$ of 2° with the direction of the axis A3 of the first embossing cylinder 3.

The protuberances P5 of the second set, on the embossing cylinder 5, are aligned in a third and fourth direction of alignment, indicated by $Lx_5$ and $Ly_5$ in FIG. 3. The directions of alignment $Lx_5$ and $Ly_5$ form between them the same angle $\alpha$ (or at least an angle very close to $\alpha$, for example with a variation of approximately 1–3°), and are orientated in the same direction with respect to the taxis A5 of the embossing cylinder 5. The direction $Lx_5$ is inclined downwards from left to right in FIG. 3, as is the direction $Lx_3$ in FIG. 2. The angle $\beta_5$ formed by the third direction of alignment $Lx_5$ with the axis A5 of the embossing cylinder 5 is, in this embodiment, different from the angle $\beta_5$ and is equal to 6°.

Figure 4:
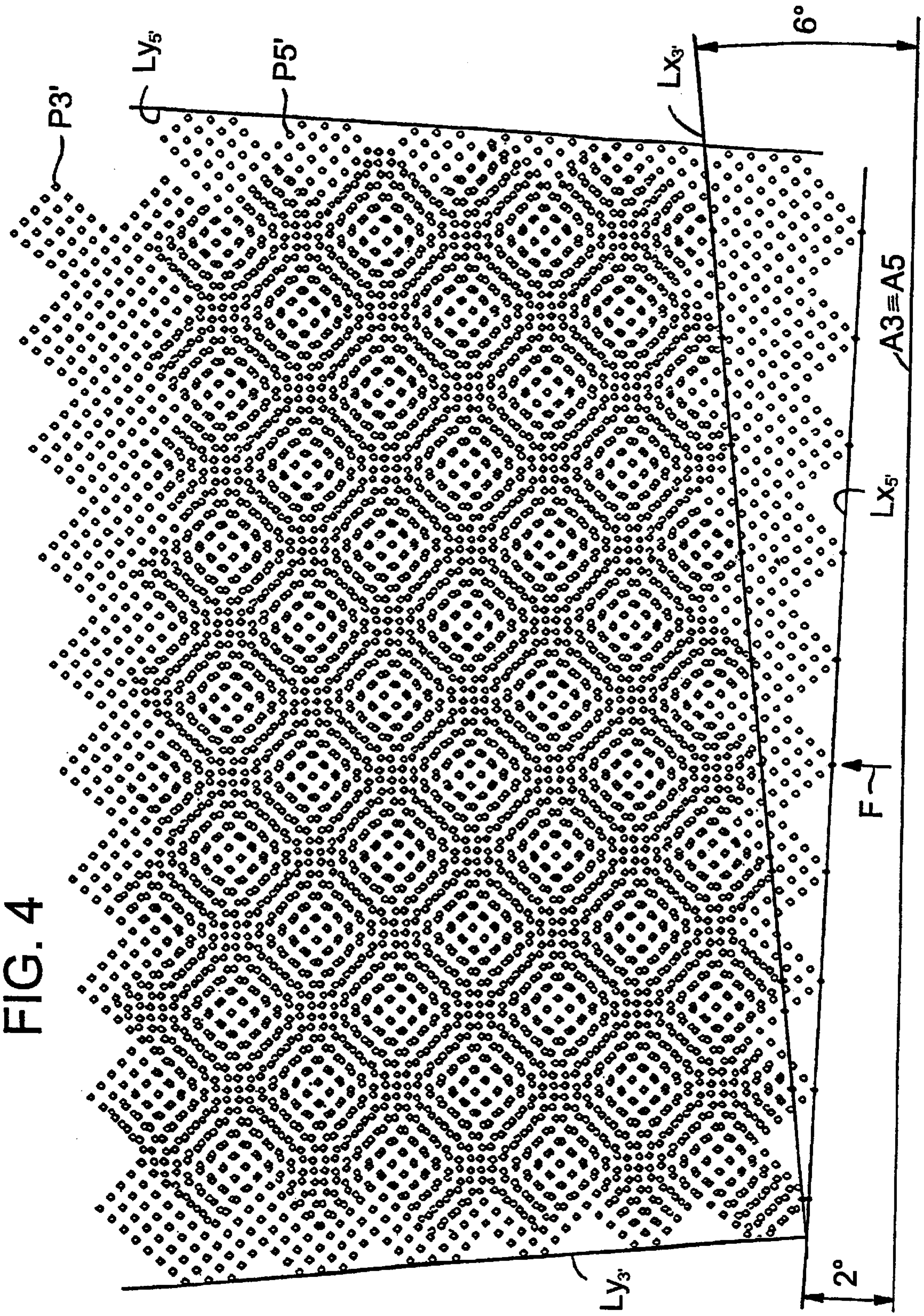
FIG. 4 is a schematic view of a portion of the two embossed and joined layers as they emerge from the embossing machine shown in FIGS. 1 to 3.
Figure 4A:
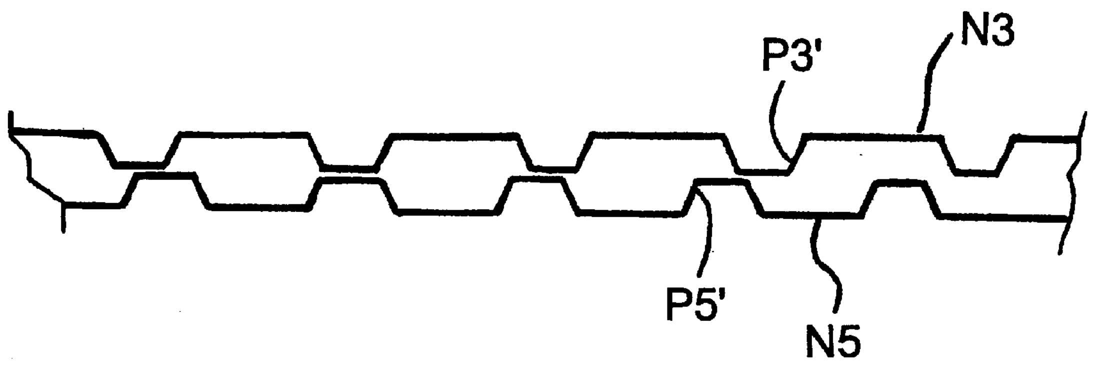
FIG. 4A shows a schematic section of the strip material in a plane perpendicular to the surface of the material and parallel to one of the directions of alignment of the protuberances.

Protuberances P3' and P5' are impressed on the two layers N3 and N5 in a pattern corresponding to that formed by the protuberances P3 and P5 on the two embossing cylinders 3 and 5 respectively. Consequently, after the two layers have been joined, there is no superimposition or coincidence of each protuberance of one layer with a corresponding protuberance of the other layer, but, as shown in FIG. 4, there is a correspondence in certain areas. The areas in which the protuberances coincide are separated from each other by areas in which the protuberances on one layer do not coincide with the protuberances of the other layer. Additionally, the areas in which the protuberances P3' and P5' coincide are aligned in two alignments which are not parallel to the axes A3 and AS of the two embossing cylinders 3 and 5. This means that, as the two layers N3 and N5 are joined, the protuberances P3 and P5 of the two embossing cylinders come into contact gradually in the area of lamination (in other words, of joining) of the strips, with an advantageous reduction in the vibration of the machine, mechanical stresses and noise.

In FIG. 4, $Lx_3'$, $Ly_3'$ and $Lx_5'$, $Ly_5'$ indicate the directions of alignment of the protuberances P3' and P5' on the first and second layer respectively. The letter F indicates the direction of advance of the strip material leaving the embossing machine.

Figure 5:
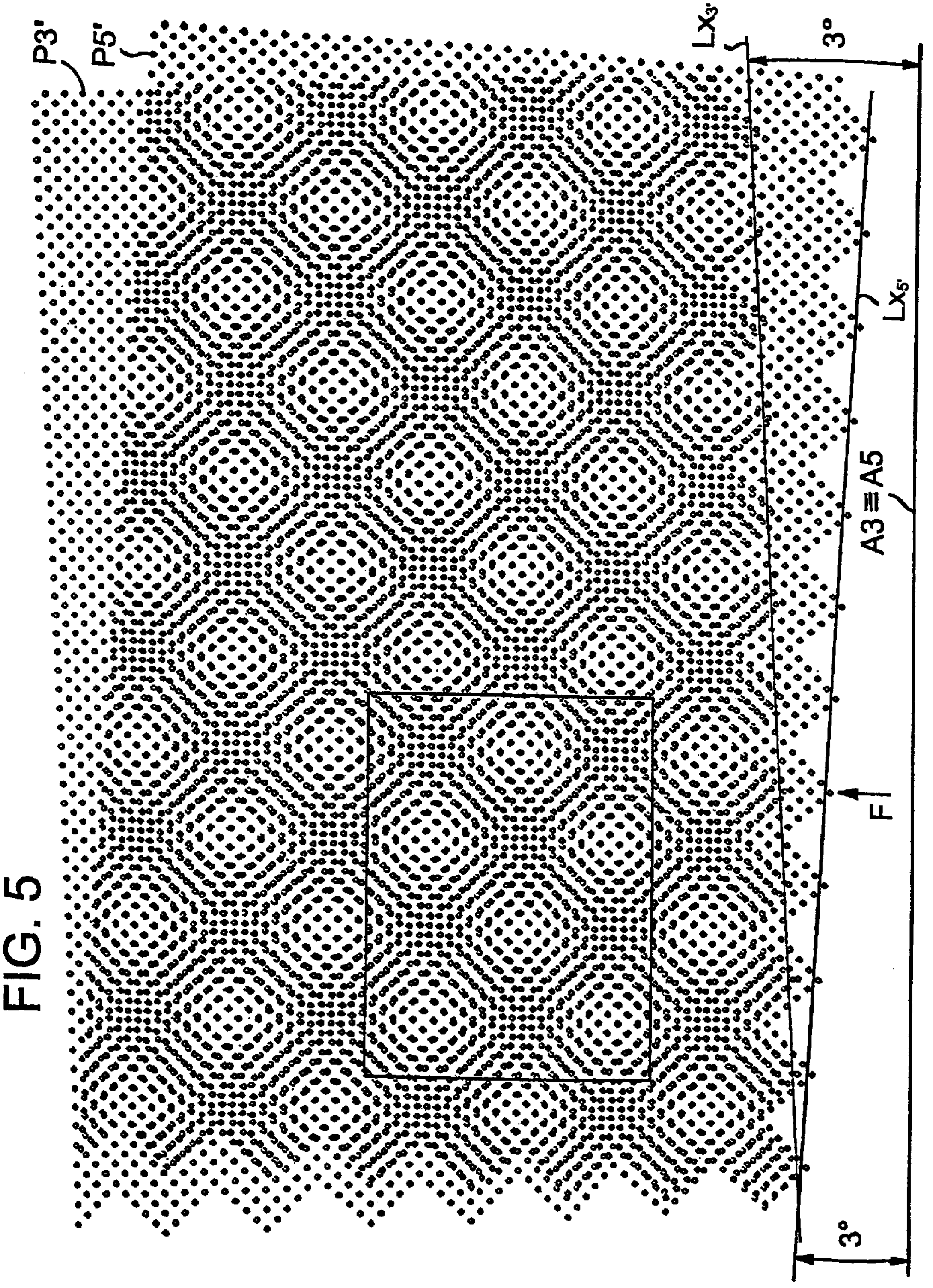
FIG. 5 is a view, similar to that in FIG. 4, of two joined layers produced by two embossing cylinders cut at the same angle.

When the two directions of alignment $Lx_3$ and $Lx_5$ are inclined at the same angle, for example $\beta_3$=$\beta_5$ 3°, there is once again the advantage of having coincidence in certain areas of the protuberances of the joined layers N3 and N5, but the areas of coincidence are disposed in an alignment parallel to the axes of the embossing cylinders 3 and 5, as shown in FIG. 5. In this case, the advantage of a reduction in vibration is lost. However, there is the advantage of making two embossing cylinders 3 and 5 which have perfectly identical incisions (and therefore protuberances).

Figure 6:
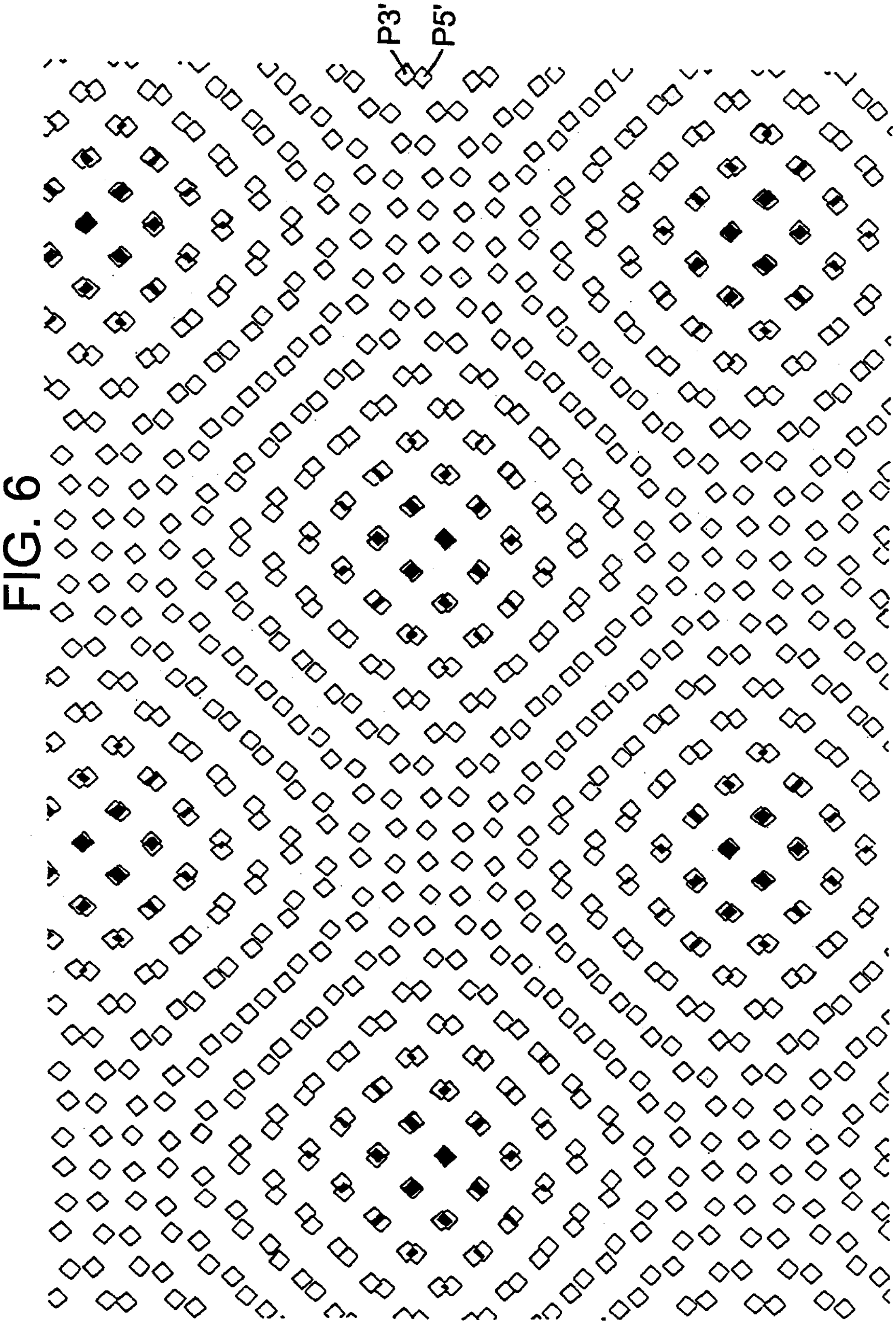
FIG. 6 shows an enlargement of a portion of FIG. 5.

FIG. 6 shows a schematic enlargement of FIG. 5, where the areas of coincidence of the protuberances P3' and P5' are clearly visible.

In the preceding text, reference has been made to protuberances of truncated pyramidal form, which are the most common. These are easily produced using simple machining processes, for example by routing. In this case, the directions of alignment advantageously coincide with the directions of the diagonals of the quadrilateral bases of the truncated pyramids. However, different forms of protuberance are not excluded.

Additionally, the inclination characteristics described above of the directions of alignment of the protuberances may be uniform over the whole of the corresponding cylinder; in other words, the directions $Lx_3$, $Ly_3$, $Lx_5$ and $Ly_5$ may have the same inclination over the whole longitudinal development of the embossing cylinder 3 or 5 respectively. However, this is not essential, and the inclination of the directions of alignment may vary gradually along the axis of the cylinder, or may vary over successive sections of the cylinder.

It should also be noted that a similar effect of partial superimposition of the protuberances P3, P5 is obtained if the two directions of alignment $Lx_3$ and $Lx_5$ are inclined in opposite directions with respect to the axes of the corresponding cylinders 3 and 5, but forming different angles with the corresponding axes.

Both in the case in which the embossing cylinders 3, 5 are made according to the illustrations in FIGS. 2–6 and in the case in which they are made with protuberances P3, P5 disposed at different intervals so as to obtain contact between the protuberances in certain areas, in order to prevent deterioration of the embossing cylinders as a result of crushing in certain areas only, which would rapidly cause them to become unserviceable, according to the invention the cylinders are rotated by means of a transmission which permits slippage between the two cylinders and therefore permits the cylinders to move out of phase. FIG. 1 shows an example of an embodiment of this type of transmission, which uses a flat belt 53 running around a driving pulley 51. The flat belt 53 runs round a pulley 55 keyed to the axle of the cylinder 3 and round a pulley 57 keyed to the axle of the cylinder 5. In order to obtain different directions of rotation for the two cylinders (clockwise for the cylinder 3 and anticlockwise for the cylinder 5), the outer face of the belt runs round the pulley 55 and its inner face runs round the pulley 57. The number 59 indicates a tensioning pulley which allows the gap between the cylinders 3 and 5 to be adjusted.

As is known by those skilled in the art, this type of transmission is not capable of maintaining the phase matching between the two pulleys 53, 55, and therefore slight slippages or movements out of phase are inevitable between the two cylinders. Whereas this phenomenon would be totally unacceptable in the embossing method using conventional tip-to-tip joining, according to the present invention it is precisely this characteristic of the transmission that is used to obtain the advantages and results described, namely the distribution of the crushing, increase in the service life of the cylinders, reduction in adjustment and maintenance operations, and the total elimination of the initial adjustment of the cylinders. A further advantage is the considerable reduction in transmission noise.

To keep the contact pressure constant, it is possible for the two embossing cylinders 3,5 to be thermostatically controlled. It has been found that, by adjusting the embossing cylinders 3, 5 in such a way that they have a gap of 0.05 mm between them when the machine is cold, this gap is eliminated or considerably reduced after twenty minutes of operation, owing to the radial expansion of the embossing cylinders due to the rise in temperature during operation (caused by the interaction with the pressure rollers, which generates heat). With a thermostatic control system, for example using a constant-temperature heat transfer fluid which circulates in the embossing cylinders 3, 5, it is possible to bring the temperature of the cylinders to a steady level before the start of the operating cycle, thereby setting the correct gap between the protuberances, which then remains unchanged throughout the operation.

Additionally, or alternatively, it is possible to use a system for controlling the pressure between the embossing cylinders 3, 5 which maintains this pressure at a constant level. This system is shown schematically in FIG. 1. The second embossing cylinder 5 and the second pressure roller 9 are carried by an oscillating moving element 16, pivoted at 16A on the structure of the machine and pressed by a cylinder and piston actuator 18 against a fixed stop 20. A movable and adjustable stop 22 carried by an extension 24 of the moving element 16 interacts with the fixed stop 20. The fixed stop is provided with a load cell which sends a signal proportional to the force exerted by the moving stop 22 to the control unit. When the geometry of the system, the force exerted by the cylinder and piston actuator 18 and the force detected by the load cell on the fixed stop 20 are known, it is possible to deduce the reaction powers between the two embossing cylinders 3, 5. Consequently, by keeping constant the force detected by the load cell (by the continuous adjustment of the adjustable stop 22 by means of a dedicated actuator) it is possible to keep the pressure between the embossing cylinders 3, 5 constant at a predetermined value.

Figure 7:
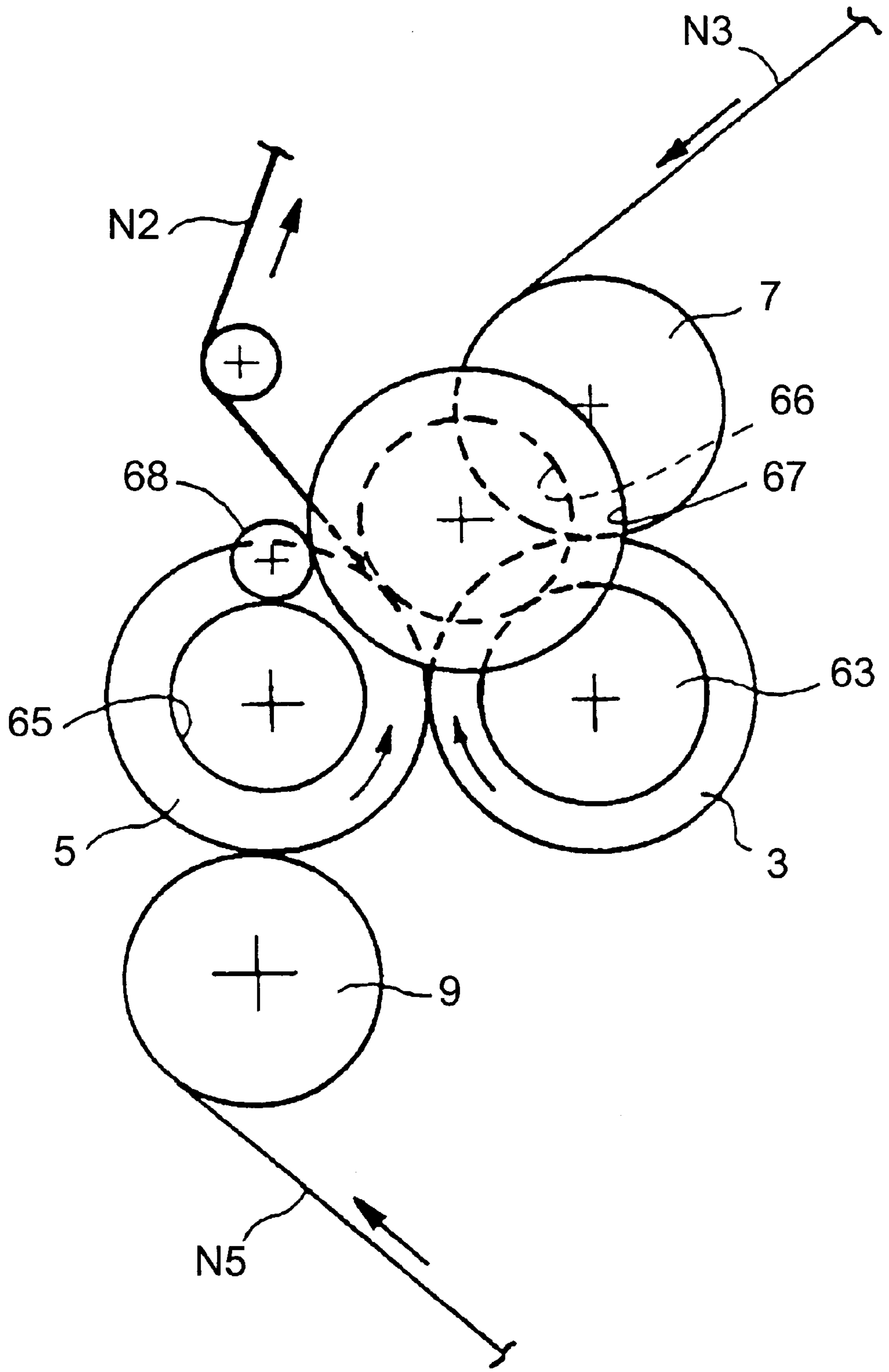
FIG. 7 shows a modified embodiment of the transmission system between two embossing cylinders.

The belt transmission between the embossing cylinders 3 and 5 has considerable advantages, as mentioned previously. However, the principal object of the present invention may also be achieved with a different type of transmission, for example a gear transmission constructed in such a way that the two embossing cylinders do not remain in phase, in other words in such a way that a slight difference in peripheral velocity, of the order of 1–2‰for example, is maintained between the cylinders 3 and 5. FIG. 7 shows a gear transmission system capable of achieving this result. Two gear wheels 63 and 65 are keyed to the axles of the two cylinders 3 and 5 respectively.

By contrast with conventional embossing machines, the two gear wheels 63, 65 do not engage directly, but have three further gear wheels 67, 68, 69 located between them, the last of which is an idle wheel, while the wheels 67, 68 are keyed to a single auxiliary axle. In this way, by appropriately selecting the number of teeth on each gear wheel, it is possible to obtain the desired ratio of velocity between the cylinders 3 and 5, for example with the previously indicated difference of the order of 1–2‰. The idle wheel 68 allows the two cylinders 3 and 5 to rotate in opposite directions.

It should be understood that the drawing shows only an example, provided solely as a practical demonstration of the invention, and that this invention may vary in its forms and arrangements without departing from the scope of the guiding concept of the invention. Any reference numbers in the enclosed claims have the purpose of facilitating the reading of the claims with reference to the description and to the drawing, and do not limit the scope of protection represented by the claims.

What is claimed is:

1. An embossing and laminating machine comprising a first embossing cylinder with a surface provided with a first set of protuberances a second embossing cylinder with a surface provided with a second set of protuberances, said two embossing cylinders forming a nip, and a first and a second pressure roller interacting with said first and second embossing cylinders respectively; and in which said sets of protuberances are made in such a way that in said nip some of said first set of protuberances coincide with some of said second set of protuberances, while other protuberances of said first set are out of phase with corresponding protuberances of said second set, wherein said embossing cylinders are mechanically connected by a transmission which does not keep the cylinders in phase and which causes slight relative slippage between said embossing cylinders.

2. The embossing and laminating machine according to claim 1, wherein said transmission is a smooth belt transmission.

3. The embossing and laminating machine according to claim 2, wherein said belt transmission comprises a single belt running around a driving pulley and around two pulleys keyed on to said embossing cylinders in such a way that opposite directions of rotation are imparted to each of said embossing cylinders.

4. The embossing and laminating machine according to claim 2, wherein said belt is a flat belt.

5. The embossing and laminating machine according to claim 1, wherein said first set of protuberances is disposed with a first interval in a first direction of alignment, and with a second interval in a second direction of alignment, said first and said second direction of alignment forming between them an angle other than zero, said first direction of alignment forming an angle of greater than zero with the horizontal direction of the axis of said first embossing cylinder; in that said second set of protuberances is disposed with said first interval in a third direction of alignment and with said second interval in a fourth direction of alignment, said third and said fourth direction of alignment forming between them an angle approximately equal to the angle formed by said first and said second direction, said third direction of alignment forming an angle of greater than zero with the horizontal direction of the axis of said third embossing cylinder; and wherein the slope of said first direction of alignment with respect to the horizontal direction of the axis of said first embossing cylinder and the slope of the said third direction of alignment with respect to the horizontal direction of the axis of said third embossing cylinder are inclined in the same direction.

6. The embossing and laminating machine according to claim 1, wherein said first set of protuberances is disposed with a first interval in a first direction of alignment and with a second interval in a second direction of alignment, said first and said second direction of alignment forming between them an angle other than zero, said first direction of alignment forming an angle of greater than zero with the horizontal direction of the axis of said first embossing cylinder; in that said second set of protuberances is disposed with said first interval in a third direction of alignment and with said second interval in a fourth direction of alignment, said third and said fourth direction of alignment forming between them an angle approximately equal to the angle formed by said first and said second direction; said third direction of alignment forming an angle of greater than zero with the horizontal direction of the axis of said third embossing cylinder; and wherein the slope of said first direction of alignment with respect to the horizontal direction of the axis of said first embossing cylinder and the slope of the said third direction of alignment with respect to the horizontal direction of the axis of said third embossing cylinder are inclined in opposite directions.

7. The embossing and laminating machine according to claim 1, wherein said first set of protuberances is aligned in a direction of alignment with an interval different from that of the protuberances of the second set in the corresponding direction of alignment.

8. The embossing and laminating machine according to claim 1, wherein the protuberances in said first set of protuberances and/or said second set of protuberances have a density of between 6 and 150 protuberances per $cm^2$.

9. The embossing and laminating machine according to claim 1, wherein said two embossing cylinders are kept at a controlled temperature during operation.

10. The embossing and laminating machine according to claim 1, further comprising a load cell which sends a signal proportional to the pressure between the two embossing cylinders, and a control system which, on the basis of the said signal, keeps the pressure between the embossing cylinders constant.

11. The embossing and laminating machine according to claim 1, wherein said transmission comprises a set of gear wheels which keep the two embossing cylinders in rotation at two different peripheral velocities.

12. The embossing and laminating machine according to claim 1, wherein the slippage between the two embossing cylinders is of the order of 0.5–3 ‰.

* * * * *